Jan. 18, 1966  R. D. HILTON  3,229,782
COLLAPSIBLE THREE WHEELED POWER VEHICLE
Filed June 23, 1964  2 Sheets-Sheet 1
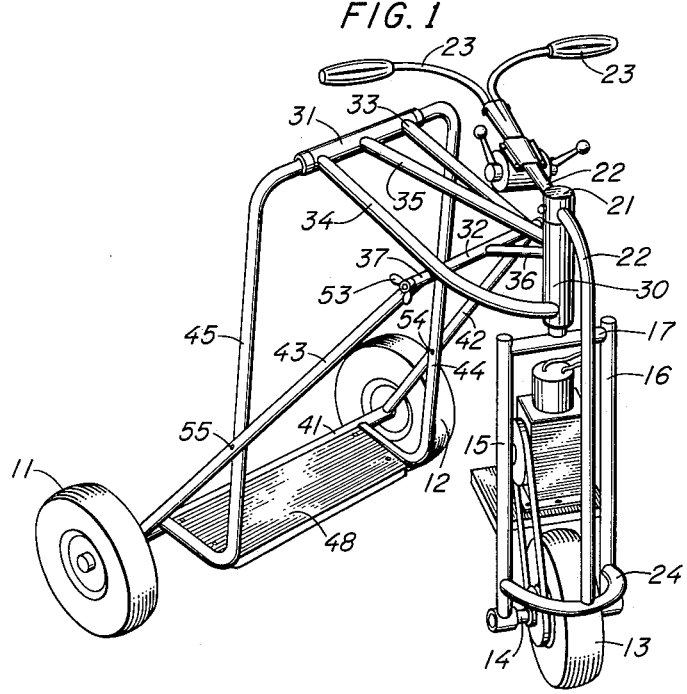
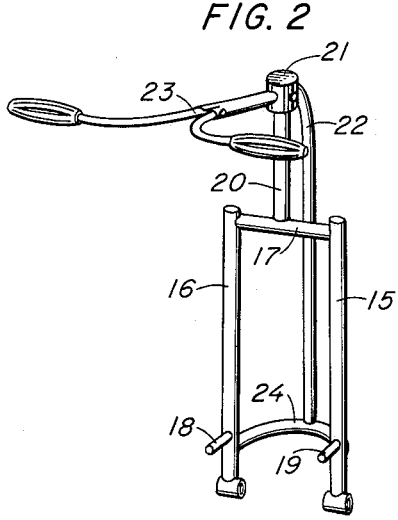
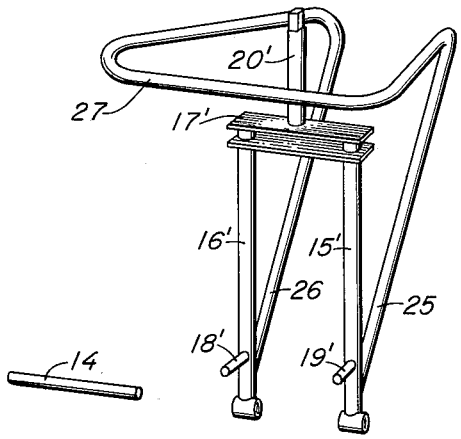
INVENTOR.
ROBERT D. HILTON
BY
ATTORNEYS Jan. 18, 1966 R. D. HILTON 3,229,782
COLLAPSIBLE THREE WHEELED POWER VEHICLE
Filed June 23, 1964 2 Sheets-Sheet 2

INVENTOR.
ROBERT D. HILTON
BY
ATTORNEYS

United States Patent Office 3,229,782
Patented Jan. 18, 1966

3,229,782
COLLAPSIBLE THREE WHEELED POWER
VEHICLE
Robert D. Hilton, 492 Hilton Drive, Madison, Wis.
Filed June 23, 1964, Ser. No. 377,425
2 Claims. (Cl. 180—26)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to a 3-wheeled vehicle powered by a suitable, compact self-contained power source, and to the method by which it collapses into a portable or easily tractable unit. The invention is particularly suitable for the transportation of one person who requires a vehicle offering a highly stable method of locomotion over diverse terrain, a substantial load bearing capability, and rapid collapsibility and light weight.

This invention contemplates the transportation of one person who stands on a platform lying substantially over two rear wheels and steering by means of a front wheel. A power source and drive means of any appropriate nature rests on the frame immediately above and somewhat behind the front wheel. Thus, when the vehicle is underway with the operator standing on the platform, the load is evenly distributed over the three wheels, making the vehicle highly stable. The tubed-steel open frame of the vehicle makes it very light; a pilot model weighs just 65 pounds. This, with the easy collapsibility, makes the vehicle easily portable when not in use.

Another object of this invention is to allow simple, rapid collapse such that the front wheel with its frame moves into a closer relationship with the rear wheels, substantially reducing the space required for its storage and allowing the vehicle to be easily transported.

These, and other objects will be apparent from the description of the invention and accompanying drawings wherein:

FIGURE 1 is a side perspective view of the vehicle herein described;

FIGURE 2 is a side perspective view of the front-wheel-frame group and FIGURE 2a is a similar view of an alternate front-wheel-frame group;

Figure 3:
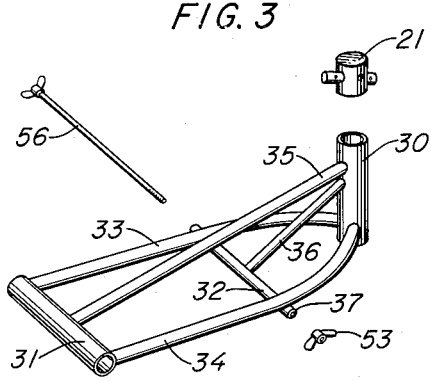
FIGURE 3 is an exploded view of the upper-frame group.

Referring now more particularly to the drawings, and to the characters of reference marked thereon, the vehicle comprises three wheels, two in the rear 11, 12, and one 13 in the front (FIG. 1), a power source and drive means, three frame groups (FIGS. 2, 2a, 3, and 4), and other accessories. The front-wheel frame group (FIG. 2) comprises an axle 14 penetrating the hub of the front wheel 13, frame members 15 and 16 vertically extending from the ends of the axle and terminating in a cross member 17. Support 18 and 19 for the power source and drive complex extends to the rear from the vertically extending frame members 15 and 16. A shaft 20 extends vertically from the center of cross member 17, terminating in a securable, removable appending cap 21. Steering bar 22 is secured to the appending cap 21, extends rearward, and terminates in a handle-bar device 23; steering bar 22 also extends forward of the single wheel frame and curves downward to its removable terminus on supporting arch 24, said arch being secured at both ends to the vertically extending frame members 15 and 16. The arched nature of supporting arch 24 allows the steering bar 22 to be attached near the axle 14, and yet allows free movement of the front wheel. An alternative steering bar is shown in FIGURE 2a which indicates double steering bar members 25 and 26 secured to appending cap 21 and extending forward of the single wheel frame, curving downward, and terminating by removable attachment to the junction of the axle 14 and the vertically extending removable frame members 15' and 16'. Note also the alternative cross member 17', supports 18' and 19', shaft 20', and handle bar device 27.

Figure 4:
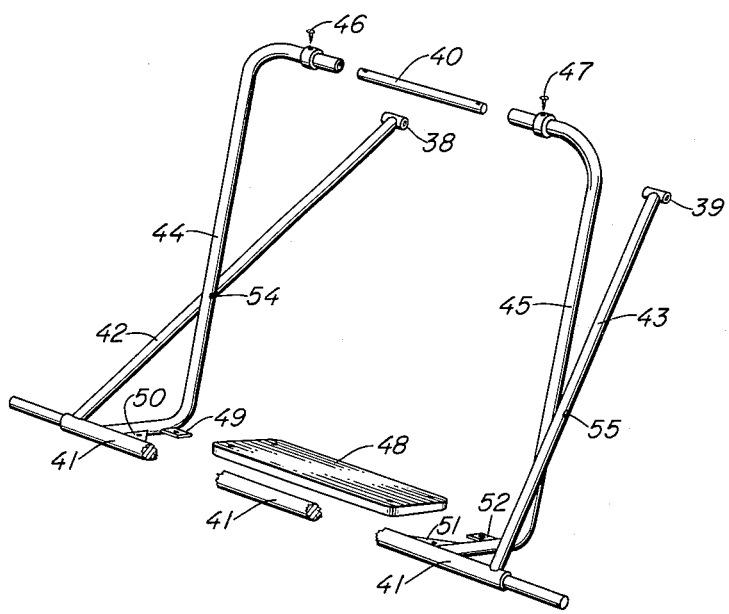
FIGURE 4 is an exploded view of the rear-wheel-frame group.

FIGURE 3 depicts the upper-frame group which unites the front-wheel frame group (FIGS. 2 or 2a) with the rear-wheel frame group (FIG. 4). Generally, the upper-frame group comprises a vertical sleeve 30 that rotates on the vertical shaft 20 of the front-wheel frame group, providing for steering of the vehicle; a horizontal sleeve 31 that rotates on the horizontal shaft 40 on the rear wheel frame group and provides for collapsibility of the vehicle; a receiver 32, providing for a removable frame connection with the rear-wheel frame group; and a strong framework.

More particularly, the upper-frame group comprises a vertical sleeve 30 adapted to effect a close fitting relationship with the vertical shaft 20 on the front-wheel frame group (FIG. 2) while allowing free rotation and thus, free steering of the shaft and single wheel frame. Sleeve 30 and the upper-frame group are secured on the vertical shaft 20 by the appending cap 21. From a point near the base of the sleeve 30 extend two frame members 33 and 34, bowing out and extending upward and to the rear, said members terminating at and secured to the ends of horizontal sleeve 31. From a point near the top of vertical sleeve 30, extends a straight frame member 35 to the rear and slightly upward, terminating at and secured to the center of horizontal sleeve 31. Thus, frame members 33, 34, and 35 provide substantial support and strength for the upper-frame group. Frame member 36, joining the receiver 32 and the vertical sleeve 30, provides additional support, although it may be omitted.

The receiver 32 is secured under the frame members 33 and 34, in a horizontal position, substantially parallel to the horizontal sleeve 31. The receiver is located approximately one-third the distance from the vertical sleeve 30 and the horizontal sleeve 31. The ends of the receiver, one of which is shown at 37, are left open and extend slightly beyond the edges of the frame members 33 and 34. The receiver is adapted to fit in a removable, close relationship with nipples 38 and 39 (FIG. 4), which fit into the openings of the receiver, one of which is shown at 37.

Horizontal sleeve 31 rotates on horizontal shaft 40 located on the rear-wheel frame group as illustrated in FIGURE 4. This group comprises two rear wheels 11 and 12, a connecting axle 41, connecting members 42 and 43 secured to the axle 41 near its extremities, and supporting frame members 44 and 45 also secured to the axle 41. Connecting frame members 42 and 43 extend on an angle from the axle upward, terminating in nipples 38 and 39. The supporting frame members 44 and 45 are attached to the axle 41 at points immediately inside the junction of the connecting frame members and the axle. The supporting frame members extend forward from the axle, curve upward, join with the connecting frame members 42 and 43 by connecting means 54 and 55, continue upward, curve inward, and terminate in removable joints on either end of horizontal shaft 40 and are secured thereto by means of set screws 46 and 47. Wheels 11 and 12 are secured to axle 41 in a free wheeling manner. Platform 48 is secured to axle 41 and rests on lips 49, 50, 51, and 52, secured to the lower, forward extending portions of the supporting frame members 44 and 45.

When the vehicle is assembled, the frame groups discussed above are not particularly distinguishable. Full assembly contemplates snug fit of horizontal sleeve 31 of the upper-frame group on the horizontal shaft 40 of the rear-wheel frame group, fitting the vertical sleeve 30 of the upper-frame group on the vertical shaft 20 of the front-wheel frame group, and securing the appending cap 21 on said horizontal shaft. The uniting of the connecting frame members 42 and 43 to the receiver 32 of the upper-frame group by placing nipples 38 and 39 into the openings at the ends of the receiver, and passing bolt 56 through the nipples 38 and 39 and the receiver 32, provides additional support and allows for the folding of the vehicles as follows. When bolt 56 is removed and connecting frame members 42 and 43 are slightly spread, a slight force upward and forward on the handle bar 23 or 27 causes the upper frame and the front wheel frame to rotate somewhat on the horizontal shaft 40, bringing the front wheel frame group in closer relationship with the rear wheels. Bolt 56 is then reinserted through nipples 38 and 39 over the handle bar 23 or 27 and nut 53 secured on said bolt, the contact between said bolt and said handle bar holding and substantially locking the forward single-wheel frame and the two-wheel frame together in a collapsed position.

While a specific embodiment of an improved, collapsible three-wheeled power vehicle has been disclosed in the foregoing description, it will be understood that various modifications within the spirit of the invention may occur to those skilled in the art. Therefore, it is intended that no limitations be placed on the invention except as defined by the scope of the appended claims.

I claim:
1. A collapsible, three wheeled power vehicle comprising,
a forward single wheel frame,
   means driving the wheel thereof,
   a shaft extending vertically from said frame in combination with steering means,
a main longitudinal frame rotatably mounted on said vertical shaft,
a horizontally disposed member secured to said longitudinal frame,
a two wheel frame,
   load supporting means mounted thereon,
   members extending vertically from said two wheel frame near the wheels thereof and pivotally connected to said longitudinal frame,
   angularly disposed members mounted on said two wheel frame in combination with detachable locking means alternatively supporting said horizontally disposed member of the longitudinal frame and securable above and against said steering means, whereby said frames may be locked into a collapsed state and an open, supported state.

2. A collapsible, three wheeled vehicle comprising,
steering and single wheel frame means with a longitudinal extension vertically pivotally secured thereto,
two wheel frame means with a plurality of vertical extensions secured thereto,
   said extensions pivotally connected substantially near their termini,
load supporting means mounted on said two wheel frame means,
members extending between said two wheel frame and said longitudinal extension, and alternatively securable to said longitudinal extension and above and against said steering means whereby a collapsed state and an open, supported state is permitted.

References Cited by the Examiner
UNITED STATES PATENTS

| | | | |
|---|---|---|---|
| 1,218,943 | 3/1917 | Hudry | 280—278 X |
| 1,326,148 | 12/1919 | Hudry | 280—278 X |
| 2,619,364 | 11/1952 | Carson | 280—287 |
| 2,771,145 | 11/1956 | Peters | 180—26 |
| 2,899,793 | 8/1959 | Swisher | 180—26 X |
| 2,910,130 | 10/1959 | Schlaphoff | 280—287 X |
| 3,004,619 | 10/1961 | Straussler | 180—27 |
| 3,099,326 | 7/1963 | Weigel et al. | 280—278 X |

KENNETH H. BETTS, *Primary Examiner.*

BENJAMIN HERSH, *Examiner.*